United States Patent
Khan et al.

(10) Patent No.: US 6,512,016 B2
(45) Date of Patent: Jan. 28, 2003

(54) COMPOSITIONS FOR DEFOAMING AQUEOUS COMPOSITIONS

(75) Inventors: Ayaz Khan, Upper Darby, PA (US); Samuel A. Firman, III, Ambler, PA (US); David W. Brown, Ambler, PA (US); John E. Nowicki, Hatfield, PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/910,373

(22) Filed: Jul. 20, 2001

(65) Prior Publication Data

US 2002/0040066 A1 Apr. 4, 2002

Related U.S. Application Data

(60) Provisional application No. 60/225,876, filed on Aug. 17, 2000.

(51) Int. Cl.$^7$ .......................... B01D 19/04; C08K 5/06; C08L 13/02
(52) U.S. Cl. ........................ 516/123; 516/124; 524/167; 524/243; 524/244; 524/245; 524/261; 524/265; 524/267; 524/366; 524/762; 525/403; 525/409
(58) Field of Search .................................. 516/123, 124, 516/129, 134; 524/243, 244, 245, 261, 265, 267, 500, 167, 762, 366; 525/403, 409

(56) References Cited

U.S. PATENT DOCUMENTS

| | | | | |
|---|---|---|---|---|
| 4,946,670 A | | 8/1990 | Sebag et al. ................. | 510/119 |
| 4,978,805 A | | 12/1990 | Baur et al. .................... | 568/622 |
| 5,250,202 A | * | 10/1993 | Reinehr et al. ................ | 516/57 |
| 5,462,697 A | | 10/1995 | Yianakopoulos et al. ... | 510/101 |
| 5,510,409 A | | 4/1996 | Romano ..................... | 524/261 |
| 5,728,895 A | | 3/1998 | Wiggins et al. ............. | 568/601 |
| 5,827,453 A | * | 10/1998 | Gross et al. ................. | 516/134 |
| 5,877,245 A | | 3/1999 | Wiggins et al. ............. | 524/366 |
| 5,895,605 A | | 4/1999 | Gross et al. ................. | 516/134 |
| 6,350,787 B1 | * | 2/2002 | Wiggins et al. ............. | 516/129 |
| 6,387,962 B1 | * | 5/2002 | Wiggins et al. ............. | 516/129 |

* cited by examiner

*Primary Examiner*—Daniel S. Metzmaier
(74) *Attorney, Agent, or Firm*—John E. Drach; Henry E. Millson, Jr.

(57) ABSTRACT

Defoaming compositions consisting essentially of:
  A) at least one organosilicone compound having defoaming activity in aqueous based compositions; and
  B) at least one base catalyzed reaction product of:
    a) a linking agent of formula I $$R^4(Y)_3 \qquad (I)$$

wherein each Y group is a halogen atom or a halogen and two Y groups on adjacent carbons in $R^4$ and an oxygen may be an epoxy group, and $R^4$ is an alkane triyl group having 3 to 10 carbon atoms; and
    b) a compound of formula II $$R^3(EO)_n(PO)_m(BO)_pX \qquad (II)$$

wherein $R^3$ is defined in the specification; n, m, and p are 0 to 50; X is hydrogen, mercapto group or amino group; when X is other than hydrogen, the sum of m, n, and p must be at least 1; the mole ratio of I:II is from about 0.6:1 to about 5:1; and aqueuos compositions containing them.

42 Claims, No Drawings

COMPOSITIONS FOR DEFOAMING AQUEOUS COMPOSITIONS

CROSS-REFERENCE TO RELATED APPLICATIONS

This application claims the benefit of copending provisional application Ser. No. 60/225,876, filed on Aug. 17, 2000, the entire contents of which are incorporated herein by reference.

FIELD OF THE INVENTION

This invention relates to compositions useful as defoamers for water-based compositions, and to the aqueous compositions containing the defoamers.

BACKGROUND OF THE INVENTION

In the preparation and use of aqueous paints and other aqueous-based compositions, problems with foaming are frequently present, causing the encapsulation of air bubbles in the aqueous compositions. These air bubbles are especially troublesome in latex paints and in the coatings resulting therefrom.

Consequently, there is a continuing demand for defoaming agents that will successfully defoam aqueous compositions while not interfering with the desirable properties of the aqueous compositions.

SUMMARY OF THE INVENTION

This invention relates to defoaming compositions, and to aqueous-based compositions containing them.

The defoaming compositions of the invention comprise

A) at least one organosilicone compound; and

B) at least one reaction product comprising the following reactants:

a) a linking agent of formula I

$$R^4(Y)_3 \quad (I)$$

wherein each Y group is a halogen atom or one Y group is a halogen atom and two Y groups with two adjacent carbon atoms in the $R^4$ group and an oxygen atom form an epoxy group, and $R^4$ is an alkanetriyl group containing from 3 to 10 carbon atoms, the preferred linking agent being epichlorohydrin; and b) a compound of formula II

$$R^3(EO)_n(PO)_m(BO)_pX \quad (II)$$

wherein $R^3$ is a substituted or unsubstituted, saturated or unsaturated, organic oxy or thio group having from 1 to 36 carbon atoms or a secondary amino group having from 2 to 36 carbon atoms; n is a number of from 0 to 50, e.g., from 1 to 50; m is a number of from 0 to 50 e.g., from 1 to 50; p is a number of from 0 to 50 e.g., from 1 to 50; and X is hydrogen, or X can be a mercapto group or an amino group in place of a terminal —OH group, provided that when X is mercapto or amino; the sum of n, m, and p must be at least 1.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

It is to be understood that the terms "defoaming compositions", "defoaming agents", "defoamers", and the like as used herein refer to compositions that reduce or eliminate foaming when added to water-based compositions.

In the component B) product of the reaction between the linking agent of formula I and the compound of formula II, the mole ratio of I:II is from 0.2:1 to 5:1, preferably from 0.4:1 to 2:1, and more preferably from 0.6:1 to 1.4:1.

The linking agent of formula I is preferably epichlorohydrin although other epihalohydrins can be used. Also, trihaloalkanes can be used, such as 1,2,3-trichloropropane, 1,2,4-trichlorobutane, 1,3,6-trichlorohexane and the like. Instead of chlorine in the epihalohydrins and the trihaloalkanes, the corresponding bromine and iodine compounds can also be used, including compounds containing two or even three of the above halogens.

In the compounds of formula II, it is understood that EO stands for the residue of ethylene oxide and PO stands for the residue of propylene oxide and BO stands for the residue of butylene oxide.

When the X group of formula (II) is a mercapto group, the $R^3$ group will preferably have from about 4 to about 36 carbon atoms, examples of which include but are not limited to, alkoxylated dodecyl mercaptan and alkoxylated 1-hexadecanethiol.

The compounds of formula (II) can be alkoxylated or non-alkoxylated secondary amines. When the compounds of formula II are secondary amines, n is a number from 0 to 50, preferably from 1 to 50, m is a number from 0 to 50 and p is a number from 0 to 50, preferably from 1 to 50. Examples of the secondary amines useful for the purposes of the invention include but are not limited to, alkoxylated dibutyl amine, alkoxylated dicyclohexyl amine, alkoxylated diethylethanolamine, and alkoxylated dioctylamine.

The substituents that can be present on the substituted $R^3$ groups can be single or multiple substitutions such as a halogen substitution, for example Cl, Fl, I and Br: a sulfur functionality such as a mercaptan or thio group; a nitrogen functionality such as an amine or amide functionality; an alcohol functionality, a silicon functionality, e.g., a siloxane; an ether functionality; or any combination thereof.

In general, compounds of formula II wherein the sum of n, m, and p is at least 1, especially at least 2, are preferred.

When $R^3$ is a secondary amino group, the group preferably contains from 4 to 22 carbon atoms.

Also, when X is hydrogen p is preferably a number of from 1 to 50. When $R^3$ is a secondary amino group, p is preferably a number of from 1 to 50.

The nonoxy and nonthio components of the $R^3$ group can be any substituted or unsubstituted, saturated or unsaturated organic moiety having from 1 to 36 carbon atoms. Thus, the nonthio and the nonoxy components of the $R^3$ aliphatic group can be linear or branched alkyl groups, linear or branched alkenyl or alkynyl groups, saturated carbocyclic moieties, unsaturated carbocyclic moieties having one or more multiple bonds, saturated heterocyclic moieties, unsaturated heterocyclic moieties having one or more multiple bonds, substituted linear or branched alkyl groups, substituted linear or branched alkenyl or alkynyl groups, substituted saturated carbocyclic moieties, substituted unsaturated carbocyclic moieties having one or more multiple bonds, substituted saturated heterocyclic moieties, and substituted unsaturated heterocyclic moieties having one or more multiple bonds. Examples of the above include but are not limited to an alkyl group having from 4 to 22 carbon atoms, an alkenyl group having from 4 to 22 carbon atoms, and an alkynyl group having from 4 to 22 carbon atoms. $R^3$ can also be an arenyl group. Arenyl groups are alkyl-substituted aromatic radicals having a free valence at an alkyl carbon atom such as a benzylic group. Alkyl groups having from 4 to 12 carbon atoms are preferred, and alkyl groups having from 8 to 10 carbon atoms are most preferred. The degree of ethoxylation is preferably from 2 to about 50 with the most preferred being from about 4 to about 50 while the degree of propoxylation and butoxylation can vary from 0 to about 50, preferably from 1 to about 10. The degree of propoxylation and or butoxylation will be determined by the desired degree of solubility or miscibility in the aqueous compositions of the invention. The solubility or miscibility will ultimately be determined by such factors as the number of carbon atoms in $R^3$ and the relative amounts EO, PO and BO.

Optionally, an additional component can be reacted with the linking agent of formula (I) and the compound of formula (II). A glycidyl ether or amine can be added to the reaction of formula (I) and formula (II). The amount of the glycidyl ether or glycidyl amine is from about 1 to about 20 mole percent based on the moles of formula (II) used in the reaction. When the glycidyl ether or glycidyl amine is added to the monofunctional starting material of formula II, the ratio of formula I to formula II plus the glycidyl ether or glycidyl amine is preferably from about 0.8 to about 1.4. Examples of the glycidyl ethers include, but are not limited to, PEG 600 Diglycidyl ether, TETRONIC™ 701 Tetraglycidyl ether, Triglycidyl Di or Triethanolamine, Polyoxyethylene (POE) 200 Tallow amine diglycidyl ether, Propoxylated (POP10) Trimethylol propane triglycidyl ether, Propoxylated (POP7) Pentaerythritol tetraglycidyl ether. Examples of glycidyl amines include, but are not limited to, Tetraglycidyl 1,6-Hexane diamine, JEFFAMINE™ Tetraglycidyl EDR-148, and Tetraglycidyl Isophorone diamine.

The component B) reaction products can be prepared by the process disclosed in U.S. Pat. No. 5,827,453, the disclosure of which is expressly incorporated herein by reference.

With respect to the component A) organosilicone compounds, most of these are organopolysiloxanes, preferably those having defoaming activity in aqueous-based compositions. Examples of the latter compounds are TEGO FOAMEX® 3062, 810, and 840, which are organo-modified polysiloxanes, manufactured by Tego Corporation of Hopewell, Va.; AF 9000, an organo-modified polyether polysiloxane manufactured by General Electric Co. of Waterford, N.Y.; and DC 2000, an organo-modified polysiloxane manufactured by Dow Corning of Midland, Mich.

The defoaming compositions of the invention can also contain other components, such as polyethylene glycols, surfactants, mineral oils, water, silicas, waxes, and the like.

The proportions of components A) and B) that can be present in the defoaming compositions can range from 90:10 to 10:90 percent by weight, preferably from 80:20 to 50:50.

The defoaming-effective quantities of the present defoaming compositions in aqueous compositions can be readily determined for any particular aqueous composition, and are generally in the range of from 0.01 to 2% by weight, more usually in the range of from 0.025 to 1.5% by weight, based on the weight of the aqueous composition.

The defoaming compositions of the invention are prepared by mixing the components together, which can be done at room temperature or at an elevated temperature, e.g., from 30 to 160° C., depending on the particular components selected.

The aqueous compositions to which the defoaming compositions of the invention can be added to include latex paints, inks, adhesives, latex processing, metal working, and the like.

The aqueous compositions of the invention when formulated with the present defoamers have very low levels of air entrapment. When used in latex paint compositions, the paints when cured have almost no surface defects such as orange peel, fish eyes, cratering or pin holing. In addition, not only do the defoamers of the invention provide excellent defoaming action during formulation, but they also act as flow and leveling agents in latex paints, with very low levels of trapped air and high gloss when the coating is applied to a substrate. In some cases, the present defoamers may actually enhance gloss in the dried coatings.

The invention will be illustrated but not limited by the following examples.

EXAMPLES

Example 1

Various defoaming agents were added to Rohm and Haas Interior/Exterior Gloss Enamel G-95-1 in several concentrations. The defoaming agents were shaken with the latex paints for five minutes, in a concentration of 0.25, 0.50 and 0.75% by weight, based on the weight of the latex paint. Bubble break times for each paint were tested by rolling and brushing onto 12"×12" Sherwin Williams Test Paper. A stopwatch was used to measure the time it took for all the bubbles to break. Timing was stopped after five minutes if complete bubble break was not achieved.

The defoaming agents, concentrations, and results obtained are set forth in Table 1 below.

The defoaming agents (#1 through #12) that were employed are identified below:

Surfactant A—100% $C_{12-14}$ fatty alcohol with about 3 moles of EO and 6 moles of PO, manufactured by Cognis Corporation of Ambler, Pa.

Silicone A—A polyether polysiloxane, manufactured by Tego Corporation of Hopewell, Va.

Silicone B—a polyether polysiloxane, manufactured by CK-Witco Corporation of Greenwich, Conn.

Surfactant B—100% 1045S STAR POLYMER—the reaction product of isodecyl alcohol•4EO and epichlorohydrin (mole ratio 1.1:1).

Surfactant C—100% STAR 31–40, which is the reaction product of $C_{12-14}$ fatty alcohol•3EO6PO and epichlorohydrin (mole ratio 1:1), manufactured by Cognis Corporation of Ambler, Pa.

Blend 1—80% by weight Surfactant A and 20% by weight Silicone A.

Blend 2—76% by weight of Silicone A and 24% by weight of Surfactant B.

Blend 3—80.6% by weight of Silicone A and 19.4% by weight of Surfactant B.

Blend 4—78% by weight of Surfactant A, 19.6% by weight of Silicone A, and 2% by weight of Surfactant B.

Blend 5—76.2% by weight of Surfactant A, 19% by weight of Silicone A, and 4.8% by weight of Surfactant B.

Blend 6—74.1% by weight of Surfactant A, 18.5% by weight of Silicone A, and 7.4% by weight of Surfactant B.

Blend 7—75% by weight of Surfactant A, 20% by weight of Silicone A, and 5% by weight of Surfactant C.

TABLE I

|  | Blank Paint | Surfactant A | Silicone A | Silicone B | Surfactant B | Surfactant C | Blend 3 |
|---|---|---|---|---|---|---|---|
| DEFOAMER USED-% BY WT | 0.00 | 0.75 | 0.75 | 0.75 | 0.75 | 0.75 | 0.75 |
| WEIGHT PER GALLON-LBS | 9.71 | 9.91 | 10.13 | 10.12 | 10.16 | 10.14 | 10.14 |
| PERCENT AIR | 5.26 | 3.31 | 1.17 | 1.26 | 0.87 | 1.07 | 1.07 |
| ROLLER BB TIME-SECS | >300 | >300 | >300 | >300 | >300 | >300 | >300 |
| BRUSH BB TIME-SECS | >300 | >300 | >300 | >300 | 70 | >300 | 43 |
| 20 DEGREE GLOSS | 70.8 | 71.8 | 26.0 | 30.0 | 68.2 | 68.1 | 68.0 |
| 60 DEGREE GLOSS | 88.9 | 89.2 | 60.9 | 64.5 | 87.7 | 88.0 | 87.4 |
| CONTRAST RATIO-3 MILS DD | 95.70 | 95.72 | 95.74 | 95.84 | 95.81 | 95.88 | 95.94 |
| SURFACE DEFECTS ROLLER | CRT | CRT | CRT | NONE | CRT | CRT | NONE |
| SURFACE DEFECTS BRUSH | CRT | CRT | CRT | NONE | NONE | CRT | NONE |
| SURFACE DEFECTS-3 MILS DD | None | NONE | CRT/FE | NONE | NONE | CRT | NONE |

KEY–> CRT = Cratering PH = Pin Holing OP = Orange Peel FE = Fish Eyes

|  | Blend 1 | Blend 2 | Blend 4 | Blend 5 | Blend 6 | Blend 7 |
|---|---|---|---|---|---|---|
| DEFOAMER USED-% BY WT | 0.75 | 0.75 | 0.75 | 0.75 | 0.75 | 0.75 |
| WEIGHT PER GALLON-LBS | 10.14 | 10.15 | 10.15 | 10.13 | 10.14 | 10.13 |
| PERCENT AIR | 1.07 | 0.97 | 0.97 | 1.17 | 1.07 | 1.17 |
| ROLLER BB TIME-SECS | 184 | 80 | 75 | 35 | 30 | 65 |
| BRUSH BB TIME-SECS | 70 | 36 | 17 | 8 | 6 | 45 |
| 20 DEGREE GLOSS | 40.8 | 66.6 | 68.8 | 68.6 | 70.3 | 59.5 |
| 60 DEGREE GLOSS | 75.0 | 86.4 | 88.5 | 88.5 | 89.0 | 84.4 |
| CONTRAST RATIO-3 MILS DD | 95.71 | 95.98 | 95.95 | 96.02 | 95.92 | 95.68 |
| SURFACE DEFECTS ROLLER | NONE | NONE | NONE | NONE | NONE | NONE |
| SURFACE DEFECTS-BRUSH | NONE | NONE | NONE | NONE | NONE | NONE |
| SURFACE DEFECTS-3MILS DD | CRT | CRT | NONE | NONE | NONE | NONE |

KEY–> CRT = Cratering PH = Pin Holing OP = Orange Peel E = Fish Eyes

|  | Blank Paint | Surfactant A | Silicone A | Silicone B | Surfactant B | Surfactant C | Blend 3 |
|---|---|---|---|---|---|---|---|
| DEFOAMER USED-% BY WT | 0.00 | 0.50 | 0.50 | 0.50 | 0.50 | 0.50 | 0.50 |
| WEIGHT PER GALLON-LBS | 9.71 | 8.46 | 10.11 | 10.11 | 10.16 | 10.09 | 10.15 |
| PERCENT AIR | 5.28 | 17.48 | 1.38 | 1.35 | 0.87 | 1.56 | 0.97 |
| ROLLER BUBBLE BREAK TIME-SECS | >300 | >300 | >300 | >300 | >300 | >300 | >300 |
| BRUSH BUBBLE BREAK TIME-SECS | >300 | >300 | >300 | >300 | >300 | >300 | >300 |
| 20 DEGREE GLOSS | 70.6 | 69.5 | 32.3 | 40.1 | 67.9 | 67.7 | 70.9 |
| 60 DEGREE GLOSS | 88.9 | 88.2 | 87.7 | 70.8 | 87.9 | 87.9 | 87.9 |
| CONTRAST RATIO-3 MILS DD | 95.73 | 95.82 | 95.50 | 95.73 | 95.96 | 95.94 | 95.92 |
| SURFACE DEFECTS ROLLER | CRT | CRT | PH | PH | PH | PH/FE | NONE |
| SURFACE DEFECTS-BRUSH | CRT | CRT | NONE | NONE | NONE | PH | NONE |
| SURFACE DEFECTS-3MILS DD | NONE | NONE | OP/FE | NONE | NONE | CRT | NONE |

KEY–> CRT = Cratering PH = Pin Holing OP = Orange Peel FE = Fish Eyes

|  | Blend 1 | Blend 2 | Blend 4 | Blend 5 | Blend 6 | Blend 7 |
|---|---|---|---|---|---|---|
| DEFOAMER USED-% BY WT | 0.50 | 0.50 | 0.50 | 0.50 | 0.50 | 0.50 |
| WEIGHT PER GALLON-LBS | 10.15 | 10.12 | 10.15 | 10.15 | 10.15 | 10.14 |
| PERCENT AIR | 0.97 | 1.26 | 0.97 | 0.97 | 0.97 | 1.07 |
| ROLLER BUBBLE BREAK TIME-SECS | 180 | 63 | 93 | 51 | 32 | 70 |
| BRUSH BUBBLE BREAK TIME-SECS | 56 | 28 | 36 | 18 | 12 | 52 |
| 20 DEGREE GLOSS | 54.7 | 86.3 | 57.0 | 70.8 | 71.6 | 67.0 |
| 60 DEGREE GLOSS | 81.5 | 86.6 | 87.1 | 88.6 | 88.8 | 87.1 |
| CONTRAST RATIO-3 MILS DD | 95.88 | 95.92 | 96.05 | 98.01 | 95.28 | 95.81 |
| SURFACE DEFECTS ROLLER | NONE | NONE | NONE | NONE | NONE | NONE |
| SURFACE DEFECTS-BRUSH | NONE | NONE | NONE | NONE | NONE | NONE |
| SURFACE DEFECTS-3MILS DD | CRT | CRT | NONE | NONE | NONE | NONE |

KEY–> CRT = Cratering PH = Pin Holing OP = Orange Peel FE = Fish Eyes

|  | Blank Paint | Surfactant A | Silicone A | Silicone B | Surfactant B | Surfactant C | Blend 3 |
|---|---|---|---|---|---|---|---|
| QUALITY CONTROL TESTS PERFORMED |  |  |  |  |  |  |  |

TABLE I-continued

| | | | | | | | |
|---|---|---|---|---|---|---|---|
| DEFOAMER USED-% BY WT | 0.00 | 0.25 | 0.25 | 0.25 | 0.25 | 0.25 | 0.25 |
| WEIGHT PER GALLON-LBS | 9.71 | 9.00 | 10.12 | 10.12 | 10.14 | 9.94 | 10.12 |
| PERCENT AIR | 5.26 | 12.18 | 1.26 | 1.28 | 1.07 | 3.02 | 1.26 |
| ROLLER BUBBLE BREAK TIME-SECS | >300 | >300 | >300 | >300 | >300 | >300 | >300 |
| BRUSH BUBBLE BREAK TIME-SECS | >300 | >300 | >300 | >300 | >300 | >300 | >300 |
| 20 DEGREE GLOSS | 68.9 | 69.6 | 47.8 | 51.4 | 68.6 | 68.8 | 69.8 |
| 60 DEGREE GLOSS | 88.5 | 88.8 | 76.9 | 78.4 | 88.0 | 88.4 | 88.3 |
| CONTRAST RATIO-3 MILS DD | 95.80 | 95.90 | 95.61 | 95.92 | 96.05 | 95.98 | 96.17 |
| SURFACE DEFECTS ROLLER | CRT | CRT | PH | PH | CRT | CRT | NONE |
| SURFACE DEFECTS-BRUSH | CRT | CRT | PH | PH | CRT | CRT | NONE |
| SURFACE DEFECTS-3MILS DD | NONE | NONE | NONE | NONE | NONE | NONE | NONE |

KEY–> CRT = Cratering  PH = Pin Holing  OP = Orange Peel  FE = Fish Eyes

| QUALITY CONTROL TESTS PERFORMED | Blend 1 | Blend 2 | Blend 4 | Blend 5 | Blend 6 | Blend 7 |
|---|---|---|---|---|---|---|
| DEFOAMER USED-% BY WT | 0.25 | 0.25 | 0.25 | 0.25 | 0.25 | 0.25 |
| WEIGHT PER GALLON-LBS | 10.15 | 10.14 | 10.14 | 10.14 | 10.13 | 10.12 |
| PERCENT AIR | 0.97 | 1.07 | 1.07 | 1.07 | 1.17 | 1.28 |
| ROLLER BUBBLE BREAK TIME-SECS | 50 | 30 | 110 | 61 | 45 | >300 |
| BRUSH BUBBLE BREAK TIME-SECS | 26 | 20 | 39 | 18 | 27 | >300 |
| 20 DEGREE GLOSS | 61.8 | 69.9 | 59.7 | 69.3 | 70.0 | 70.0 |
| 60 DEGREE GLOSS | 84.7 | 88.3 | 88.7 | 87.9 | 88.7 | 88.6 |
| CONTRAST RATIO-3 MILS DD | 95.79 | 96.78 | 95.77 | 95.90 | 95.95 | 96.17 |
| SURFACE DEFECTS ROLLER | NONE | NONE | NONE | NONE | NONE | NONE |
| SURFACE DEFECTS-BRUSH | NONE | NONE | NONE | NONE | NONE | NONE |
| SURFACE DEFECTS-3MILS DD | CRT | CRT | NONE | NONE | NONE | NONE |

KEY–> CRT = Cratering  PH = Pin Holing  OP = Orange Peel  FE = Fish Eyes

What is claimed is:

1. A defoaming composition consisting essentially of:
   A) at least one organosilicone compound which has defoaming activity in aqueous-based compositions; and
   B) at least one base-catalyzed reaction product consisting essentially of the following reactants:
      a) a linking agent of formula I $$R^4(Y)_3 \quad (I)$$

wherein each Y group is a halogen atom or one Y group is a atom and two Y groups with two adjacent carbon atoms in the $R^4$ group and an oxygen atom form an epoxy group, and $R^4$ is an alkanetriyl group containing from 3 to 10 carbon atoms; and
      b) a compound of formula II $$R^3(EO)_n(PO)_m(BO)_pX \quad (II)$$

wherein $R^3$ is a substituted or unsubstituted, saturated or unsaturated, organic oxy or thio group having from 1 to 36 carbon atoms or a secondary amino group having from 2 to 36 carbon atoms; n is a number of from 0 to about 50; m is a number of from 0 to about 50; p is a number from 0 to about 50; and X is hydrogen, or X can be a mercapto group or an amino group in place of a terminal —OH group, provided that when X is mercapto or amino, the sum of n, m, and p must be at least 1; and the mole ratio of formula (I):(II) is from about 0.6:1 to about 5:1.

2. The composition of claim 1, wherein the component B) a) linking agent is an epihalohydrin.

3. The composition of claim 2, wherein the epihalohydrin is epichlorohydrin.

4. The composition of claim 1, wherein said mole ratio is from about 0.6:1 to about 2:1.

5. The composition of claim 1, wherein said mole ratio is from about 0.6:1 to about 1.4:1.

6. The composition of claim 1, wherein in component B) b), the sum of n, m, and p is at least 2.

7. The composition of claim 1, wherein in component B) b), p is a number of from 1 to about 50.

8. The composition of claim 1, wherein in component B) b), $R^3$ is an alkyl group having from 4 to 12 carbon atoms.

9. The composition of claim 8, wherein in component B) b), the alkyl group contains from 8 to 10 carbon atoms.

10. The composition of claim 1, wherein in component B) b) n is a number from 2 to about 50.

11. The composition of claim 1, wherein in component B) b), $R^3$ is an alkyl group having from 4 to 12 carbon atoms and n is a number from 2 to about 50.

12. The composition of claim 1, wherein in component B) b), $R^3$ is an alkyl group having from 8 to 10 carbon atoms and n is a number from 4 to about 50.

13. The composition of claim 1, wherein in component B) b) X is hydrogen and p is a number of from 1 to about 50.

14. The composition of claim 1, wherein component B) b) is isodecyl alcohol•4EO.

15. The composition of claim 1, wherein components A) and B) are present in a ratio of about 90:10 to about 10:90 weight percent.

16. The composition of claim 15 wherein said weight ratio is from about 80:20 to about 50:50.

17. The composition of claim 1 wherein component A) is an organopolysiloxane.

18. In an aqueous composition, the improvement wherein the aqueous composition contains a defoaming-effective quantity of the defoaming composition of claim 1.

19. The aqueous composition of claim 18, wherein the defoaming-effective quantity is from about 0.1 to about 2% by weight, based on the weight of the aqueous composition.

20. The aqueous composition of claim 19 wherein said defoaming effective quantity is from about 0.2 to about 0.5%.

21. The aqueous composition of claim 18, wherein the aqueous composition is an ink, an adhesive, a latex, or a metal working composition.

22. A method of defoaming an aqueous composition comprising adding to the aqueous composition a defoaming-effective quantity of the defoaming composition of claim 1.

23. The method of claim 22 wherein said aqueous composition is a latex paint.

24. In a latex paint composition, the improvement wherein the latex paint composition contains a defoaming-effective quantity of a defoaming composition consisting essentially of:
A) at least one organosilicone compound which has defoaming activity in aqueous-based compositions; and
B) at least one base-catalyzed reaction product consisting essentially of the following reactants:
a) a linking agent of formula I

$$R^4(Y)_3 \qquad (I)$$

wherein each Y group is a halogen atom or one Y group is a halogen atom and two Y groups with two adjacent carbon atoms in the $R^4$ group and an oxygen atom form an epoxy group, and $R^4$ is an alkanetriyl group containing from 3 to 10 carbon atoms; and
b) a compound of formula II

$$R^3(EO)_n(PO)_m(BO)_pX \qquad (II)$$

wherein $R^3$ is a substituted or unsubstituted, saturated or unsaturated, organic oxy or thio group having from 1 to 36 carbon atoms or a secondary amino group having from 2 to 36 carbon atoms; n is a number of from 0 to about 50; m is a number of from 0 to about 50; p is a number of from 0 to about 50; and X is hydrogen, or X can be a mercapto group or an amino group in place of a terminal —OH group, provided that when X is mercapto or amino; the sum of n, m, and p must be at least 1; and the mole ratio of formula (I):(II) is from about 0.6:1 to about 5:1.

25. The latex paint composition of claim 24, wherein the component B) a) linking agent is an epihalohydrin.

26. The latex paint of claim 25, wherein the epihalohydrin is epichlorohydrin.

27. The latex paint composition of claim 24, wherein said mole ratio is from about 0.6:1 to about 2:1.

28. The latex paint composition of claim 24, wherein said mole ratio is from about 0.6:1 to about 1.4:1.

29. The latex paint composition of claim 24, wherein in component B) b), the sum of n, m, p is at least 2.

30. The latex paint composition of claim 24, wherein in component B) b), p is a number of from 1 to about 50.

31. The latex paint composition of claim 24, wherein in component B) b), $R^3$ is an alkyl group having from 4 to 12 carbon atoms.

32. The latex paint composition of claim 31, wherein in component B) b), the alkyl group contains from 8 to 10 carbon atoms.

33. The latex paint composition of claim 24, wherein in component B) b), n is a number from 2 to about 50.

34. The latex paint composition of claim 24, wherein in component B) b), $R^3$ is an alkyl group having from 4 to 12 carbon atoms and n is a number from about 2 to about 50.

35. The latex paint composition of claim 24, wherein in component B) b), $R^3$ is an alkyl group having from 8 to 10 carbon atoms and n is a number from about 4 to about 50.

36. The latex paint composition of claim 24, wherein in component B) b), X is hydrogen and p is a number of from 1 to about 50.

37. The latex paint composition of claim 24, wherein component B) b) is isodecyl alcohol•4EO.

38. The latex paint composition of claim 24, wherein components A) and B) are present in the defoaming composition in a ratio of about 90:10 to about 10:90 weight percent.

39. The latex paint composition of claim 38, wherein said weight ratio is from about 80:20 to about 50:50.

40. The latex paint composition of claim 24, wherein component A) is an organopolysiloxane.

41. The latex paint composition of claim 24, wherein the defoaming-effective quantity is from about 0.1 to about 2% by weight, based on the weight of the latex paint composition.

42. The latex paint composition of claim 41 wherein said defoaming effective quantity is from about 0.2 to about 0.5%.

* * * * *